(12) United States Patent
Tokuyasu et al.

(10) Patent No.: US 8,284,746 B2
(45) Date of Patent: Oct. 9, 2012

(54) WIRELESS RELAY DEVICE AND WIRELESS COMMUNICATION SYSTEM

(75) Inventors: Tomohiro Tokuyasu, Yokosuka (JP); Makoto Umeuchi, Yokosuka (JP); Toshihiro Manabe, Yokosuka (JP); Hiroshi Hojo, Yokosuka (JP); Kengo Nagata, Yokosuka (JP); Tadao Kobayashi, Tokyo (JP)

(73) Assignees: Nippon Telegraph and Telephone Corporation, Tokyo (JP); NTT Broadband Platform, Inc., Tokyo (JP)

( * ) Notice: Subject to any disclaimer, the term of this patent is extended or adjusted under 35 U.S.C. 154(b) by 189 days.

(21) Appl. No.: 12/676,326

(22) PCT Filed: Aug. 28, 2008

(86) PCT No.: PCT/JP2008/002334
§ 371 (c)(1), (2), (4) Date: Mar. 3, 2010

(87) PCT Pub. No.: WO2009/031282
PCT Pub. Date: Mar. 12, 2009

(65) Prior Publication Data
US 2010/0172285 A1 Jul. 8, 2010

(30) Foreign Application Priority Data
Sep. 4, 2007 (JP) ................................. 2007-229174

(51) Int. Cl.
*H04L 4/00* (2006.01)
(52) U.S. Cl. ...................................................... 370/338
(58) Field of Classification Search ........................ None
See application file for complete search history.

(56) References Cited

U.S. PATENT DOCUMENTS

| | | | |
|---|---|---|---|
| 2004/0009751 A1* | 1/2004 | Michaelis et al. | 455/62 |
| 2004/0121768 A1 | 6/2004 | Maki et al. | |
| 2005/0181792 A1 | 8/2005 | Kobayashi et al. | |
| 2006/0045054 A1 | 3/2006 | Utsumi et al. | |
| 2006/0291455 A1* | 12/2006 | Katz et al. | 370/355 |
| 2007/0121521 A1* | 5/2007 | D'Amico et al. | 370/252 |
| 2007/0183344 A1* | 8/2007 | Joshi | 370/254 |
| 2008/0046542 A1* | 2/2008 | Sano | 709/218 |

FOREIGN PATENT DOCUMENTS

| | | |
|---|---|---|
| EP | 1 480 388 A2 | 11/2004 |
| EP | 1 768 313 A2 | 3/2007 |
| JP | 2002-271256 A | 9/2002 |
| JP | 2003-101465 A | 4/2003 |

(Continued)

*Primary Examiner* — Anh-Vu Ly
(74) *Attorney, Agent, or Firm* — Harness, Dickey & Pierce, P.L.C.

(57) ABSTRACT

A wireless relay device connecting a wireless terminal to one of a plurality of access networks with different wireless interfaces and performing relay processing between the wireless terminal and one of the plurality of access networks being connected, the wireless relay device including a wireless interface on local side to be connected to the wireless terminal, a plurality of wireless interfaces on network side to be connected to the plurality of respective access networks, and a connection control section which boots the plurality of wireless interfaces on network side when the wireless interface on local side receives a signal from the wireless terminal, connects a wireless interface on network side establishing a fastest connection and the wireless interface on local side, and connects the wireless terminal to an access network corresponding to the wireless interface on network side establishing the fastest connection.

13 Claims, 10 Drawing Sheets

FOREIGN PATENT DOCUMENTS

| | | |
|---|---|---|
| JP | 2003-249937 A | 9/2003 |
| JP | 2004-007411 A | 1/2004 |
| JP | 2004-153802 A | 5/2004 |
| JP | 2004-179958 A | 6/2004 |
| JP | 2004-343678 A | 12/2004 |
| JP | 2004-349873 A | 12/2004 |
| JP | 2005-057392 A | 3/2005 |
| JP | 2006-140784 A | 6/2006 |
| JP | 2006-217382 A | 8/2006 |
| TW | 200507663 A | 2/2005 |

* cited by examiner (1)

1    7∼    WIRELESS CHANNELS (2)

1   ∼4    WIRELESS CHANNELS (3)

1    5∼6    WIRELESS CHANNELS

Fig. 4

CHANNEL NUMBERS of WIRELESS LANS on LOCAL SIDE

| | 1 | 2 | 3 | 4 | 5 | 6 | 7 | 8 | 9 | 10 | 11 | 12 | 13 |
|---|---|---|---|---|---|---|---|---|---|---|---|---|---|
| 1 | B | B | B | B | D | D | A | A | A | A | A | A | A |
| 2 | B | B | B | B | B | D | D | A | A | A | A | A | A |
| 3 | B | B | B | B | B | B | D | D | A | A | A | A | A |
| 4 | B | B | B | B | B | B | B | D | D | A | A | A | A |
| 5 | D | B | B | B | B | B | B | B | D | D | A | A | A |
| 6 | D | D | B | B | B | B | B | B | B | D | D | A | A |
| 7 | A | D | D | B | B | B | B | B | B | B | D | D | A |
| 8 | A | A | D | D | B | B | B | B | B | B | B | D | D |
| 9 | A | A | A | D | D | B | B | B | B | B | B | B | D |
| 10 | A | A | A | A | D | D | B | B | B | B | B | B | B |
| 11 | A | A | A | A | A | D | D | B | B | B | B | B | B |
| 12 | A | A | A | A | A | A | D | D | B | B | B | B | B |
| 13 | A | A | A | A | A | A | A | D | D | B | B | B | B |

CHANNEL NUMBERS of WIRELESS LANS on NETWORK SIDE

Fig. 5

CHANNEL NUMBERS of WIRELESS LANS on LOCAL SIDE

| | 1 | 2 | 3 | 4 | 5 | 6 | 7 | 8 | 9 | 10 | 11 | 12 | 13 |
|---|---|---|---|---|---|---|---|---|---|---|---|---|---|
| 1 | B | C | C | C | D | D | A | A | A | A | A | A | A |
| 2 | C | B | C | C | C | D | D | A | A | A | A | A | A |
| 3 | C | C | B | C | C | C | D | D | A | A | A | A | A |
| 4 | C | C | C | B | C | C | C | D | D | A | A | A | A |
| 5 | D | C | C | C | B | C | C | C | D | D | A | A | A |
| 6 | D | D | C | C | C | B | C | C | C | D | D | A | A |
| 7 | A | D | D | C | C | C | B | C | C | C | D | D | A |
| 8 | A | A | D | D | C | C | C | B | C | C | C | D | D |
| 9 | A | A | A | D | D | C | C | C | B | C | C | C | D |
| 10 | A | A | A | A | D | D | C | C | C | B | C | C | C |
| 11 | A | A | A | A | A | D | D | C | C | C | B | C | C |
| 12 | A | A | A | A | A | A | D | D | C | C | C | B | C |
| 13 | A | A | A | A | A | A | D | D | C | C | C | C | B |

CHANNEL NUMBERS of WIRELESS LANS on NETWORK SIDE

Fig. 7

CHANNEL NUMBERS of WIRELESS LANS on LOCAL SIDE

| | | 1 | 2 | 3 | 4 | 5 | 6 | 7 | 8 | 9 | 10 | 11 | 12 | 13 |
|---|---|---|---|---|---|---|---|---|---|---|---|---|---|---|
| CHANNEL NUMBERS used by NEIGHBORING WIRELESS LANS | 1 | B | C | C | A | A | A | A | A | A | A | A | A | A |
| | 2 | C | B | C | C | A | A | A | A | A | A | A | A | A |
| | 3 | C | C | B | C | C | A | A | A | A | A | A | A | A |
| | 4 | A | C | C | B | C | C | A | A | A | A | A | A | A |
| | 5 | A | A | C | C | B | C | C | A | A | A | A | A | A |
| | 6 | A | A | A | C | C | B | C | C | A | A | A | A | A |
| | 7 | A | A | A | A | C | C | B | C | C | A | A | A | A |
| | 8 | A | A | A | A | A | C | C | B | C | C | A | A | A |
| | 9 | A | A | A | A | A | A | C | C | B | C | C | A | A |
| | 10 | A | A | A | A | A | A | A | C | C | B | C | C | A |
| | 11 | A | A | A | A | A | A | A | C | C | B | C | C |
| | 12 | A | A | A | A | A | A | A | A | C | C | B | C |
| | 13 | A | A | A | A | A | A | A | A | A | C | C | B |

Fig. 9

CHANNEL NUMBERS of WIRELESS LANS on LOCAL SIDE

| 1 | 2 | 3 | 4 | 5 | 6 | 7 | 8 | 9 | 10 | 11 | 12 | 13 |
|---|---|---|---|---|---|---|---|---|----|----|----|----|
| A | A | A | A | A | A | D | D | D | D  | D  | D  | D  |

US 8,284,746 B2

WIRELESS RELAY DEVICE AND WIRELESS COMMUNICATION SYSTEM

CROSS-REFERENCE TO THE RELATED APPLICATIONS

This application is a U.S. National Stage application claiming the benefit of prior filed International Application Number PCT/JP2008/002334, filed Aug. 28, 2008, in which the International Application claims priority from Japanese Patent Application Number 2007-229174, filed on Sep. 4, 2007, the entire contents of which are incorporated herein by reference.

TECHNICAL FIELD

The present invention relates to a wireless relay device and wireless communication system that enable wireless terminals connectable to a specific access network to connect to various types of access networks with different wireless interfaces and allow switching between a plurality of access networks.

Here, the various types of access networks with different wireless interfaces may include, for example, a wireless LAN, a cellular phone, a PHS (Personal Handy-phone System), HSDPA (High Speed Downlink Packet Access), WiMAX (Worldwide Interoperability for Microwave Access) and the like. The present invention, for example, enables wireless LAN terminals to connect to a wireless LAN and other access networks and allows switching between the plurality of access networks.

BACKGROUND ART

Automatic network switching systems in the past, for example, have been adapted to use wireless terminals supporting two kinds of access networks of a wireless LAN and a PHS and properly switch connection between the access networks in accordance with the signal levels and in the order of priority in consideration of the service fees (Patent Document 1).

In addition, in order to expand the service area of a wireless LAN, there have further been proposed a system that includes a wireless relay device between wireless LAN terminals and a wireless LAN access point and a system that causes another wireless LAN terminal to function as a relay device (Patent Documents 2 and 3).

There has been studied migration management for implementing seamless handoff when wireless terminals move between access networks with different wireless interfaces.

Patent Document 1: Japanese Unexamined Patent Application Publication No. 2004-179958
Patent Document 2: Japanese Unexamined Patent Application Publication No. 2004-007411
Patent Document 3: Japanese Unexamined Patent Application Publication No. 2003-249937

DISCLOSURE

Problems to be Solved

There have been presently provided various types of access networks with different wireless interfaces. Though some wireless terminals support both of a wireless LAN and a PHS, for example, there are no wireless terminals that can connect to all access networks. However, providing wireless terminals with a function enabling connection to all access networks is not beneficial also from the viewpoints of the portability and cost performance of wireless terminals.

On the other hand, a mechanism that enables wireless terminals only supporting one access network to connect other access networks, if any, may allow the wireless terminals to receive the supply of a requested service ordinarily over an access network that may be optimum from the viewpoints of signal levels and fees thereof without individually identifying the access networks.

It is a proposition of the present invention to provide a wireless relay device and wireless communication system that enable wireless terminals connectable to a specific access network to connect to a plurality of access networks with different wireless interfaces and allow switching between a plurality of access networks.

Means for Solving the Problems

According to the first invention, a wireless relay device connecting a wireless terminal to one of a plurality of access networks with different wireless interfaces and performing relay processing between the wireless terminal and one of the plurality of access networks being connected, the wireless relay device includes a wireless interface on local side which has a wireless interface to be connected to the wireless terminal, a plurality of wireless interfaces on network side which have wireless interfaces to be connected to the plurality of respective access networks, and a connection control section which boots the plurality of wireless interfaces on network side when the wireless interface on local side receives a signal from the wireless terminal, connects a wireless interface on network side establishing a fastest connection and the wireless interface on local side, and connects the wireless terminal to an access network corresponding to the wireless interface on network side establishing the fastest connection.

In the wireless relay device according to the first invention, the plurality of wireless interfaces on network side may monitor signal levels between the plurality of wireless interfaces on network side and the respective access networks being connected and notify results to the connection control section, and the connection control section may compare the signal levels between the plurality of wireless interfaces on network side and the access networks notified from the plurality of wireless interfaces on network side and, when there is one or more wireless interfaces on network side having a better signal level than a signal level of the wireless interface on network side establishing the fastest connection, switch to a wireless interface on network side having a best signal level among the one or more wireless interfaces on network side.

In the wireless relay device according to the first invention, the wireless interfaces on network side may monitor at least one of a received signal strength indication, a throughput, a delay and an interference level as the signal levels.

In the wireless relay device according the first invention, the connection control section may include information on priority levels and service fees of the plurality of access networks, and may compare and determine parameters of the priority levels and service fees in addition to the signal levels, select one wireless interface on network side and connect one wireless interface on network side being selected to the wireless interface on local side.

In the wireless relay device according to the first invention, one of the plurality of access networks and one of the plurality of wireless interfaces on network side may support a wireless LAN, and the wireless interface on local side and the wireless terminal may support another wireless LAN, the wireless relay device may further include a channel control section which controls so as to, when one of the plurality of wireless interfaces on network side and the wireless interface on local side supporting the wireless LAN are relayed via the connection control section, acquire a wireless LAN channel number on network side used by one of the plurality of wireless interfaces on network side, and when the wireless LAN channel number on network side and a wireless LAN channel number on local side used by the wireless interface on local side are detected as being same or near each other, change the wireless LAN channel number on local side to another channel number which is not same as and near the wireless LAN channel number on network side, and the wireless interface on local side may have a function to, when a channel number is instructed from the channel control section, switch a wireless channel between the wireless terminal and the wireless interface on local side to the channel number being instructed.

In the wireless relay device according to the first invention, one of the plurality of access networks and one of the plurality of wireless interfaces on network side may support a wireless LAN, and the wireless interface on local side and the wireless terminal may support another wireless LAN, the wireless relay device may further include a channel control section which controls so as to, when one of the plurality of wireless interfaces on network side and the wireless interface on local side supporting the wireless LAN are relayed via the connection control section, acquire a wireless LAN channel number on network side used by one of the plurality of wireless interfaces on network side, and when the wireless LAN channel number on network side and a wireless LAN channel number on local side used by the wireless interface on local side are detected as channel numbers having mutual interference, change the wireless LAN channel number on local side to another channel number with low quality degradation due to an interference with the wireless LAN channel number on network side, and the wireless interface on local side may have a function to, when a channel number is instructed from the channel control section, switch a wireless channel between the wireless terminal and the wireless interface on local side to the channel number being instructed.

In the wireless relay device according to the first invention, one of the plurality of access networks and one of the plurality of wireless interfaces on network side may support a wireless LAN, and the wireless interface on local side and the wireless terminal may support another wireless LAN, the wireless relay device may further include a channel control section which controls so as to, when one of the plurality of wireless interfaces on network side not supporting the wireless LAN and the wireless interface on local side supporting the wireless LAN are relayed via the connection control section, acquire a channel number used by a neighboring wireless LAN from one of the plurality of wireless interfaces on network side supporting the wireless LAN, and when the channel number used by the neighboring wireless LAN and a wireless LAN channel number on local side used by the wireless interface on local side are detected as being same or near each other, change the wireless LAN channel number on local side to another channel number which is not near the channel number used by the neighboring wireless LAN, and the wireless interface on local side has a function to, when a channel number is instructed from the channel control section, switch a wireless channel between the wireless terminal and the wireless interface on local side to the channel number being instructed.

In the wireless relay device according to the first invention, one of the plurality of access networks and one of the plurality of wireless interfaces on network side may support a wireless LAN, and the wireless interface on local side and the wireless terminal may support another wireless LAN, the wireless relay device may further include a channel control section which controls so as to, when one of the plurality of wireless interfaces on network side not supporting the wireless LAN and the wireless interface on local side supporting the wireless LAN are relayed via the connection control section, acquire a channel number used by a neighboring wireless LAN from one of the plurality of wireless interfaces on network side supporting the wireless LAN, and when the channel number used by the neighboring wireless LAN and a wireless LAN channel number on local side used by the wireless interface on local side are detected as channel numbers with mutual interference, change the wireless LAN channel number on local side to another channel number with low quality degradation due to an interference with the wireless channel used by the neighboring wireless LAN, and the wireless interface on local side has a function to, when a channel number is instructed from the channel control section, switch a wireless channel between the wireless terminal and the wireless interface on local side to the channel number being instructed.

In the wireless relay device according to the first invention, one of the plurality of access networks and one of the plurality of wireless interfaces on network side may support WiMAX and the wireless interface on local side and the wireless terminal may support a wireless LAN, the wireless relay device may further include a channel control section which controls so as to, when the wireless interface on network side supporting the WiMAX and the wireless interface on local side supporting the wireless LAN are relayed via the connection control section and when a channel number used by the WiMAX and a wireless LAN channel number on local side used by the wireless interface on local side are detected as channel numbers with mutual interference, change the wireless LAN channel number on local side to another channel number with low quality degradation due to an interference with the wireless channel used by the WiMAX, and the wireless interface on local side may have a function to, when a channel number is instructed from the channel control section, switch a wireless channel between the wireless terminal and the wireless interface on local side to the channel number being instructed.

In the wireless relay device according to the first invention, the channel control section may give priority levels to channel numbers in ascending order of the quality degradation due to the interference, and the wireless LAN channel number on local side may be selected in accordance with priority levels from channel numbers excluding channel numbers with low priority levels.

According to the second invention, a wireless communication system includes a wireless relay device connecting a wireless terminal to one of a plurality of access networks with different wireless interfaces and performing relay processing between the wireless terminal and one of the plurality of access networks being connected, in which the wireless relay device includes a wireless interface on local side which has a wireless interface to be connected to the wireless terminal, a plurality of wireless interfaces on network side which have wireless interfaces to be connected to the plurality of respective access networks, and a connection control section which boots the plurality of wireless interfaces on network side when the wireless interface on local side receives a signal from the wireless terminal, connects a wireless interface on network side establishing a fastest connection and the wireless interface on local side, and connects the wireless terminal to an access network corresponding to the wireless interface on network side establishing the fastest connection.

In the wireless communication system according to the second invention, the plurality of wireless interfaces on network side may monitor signal levels between the plurality of wireless interfaces on network side and the respective access networks and notify results to the connection control section, and the connection control section may compare the signal levels between the plurality of wireless interfaces on network side and the access networks notified from the plurality of wireless interfaces on network side and, when there is one or more wireless interfaces on network side having a better signal level than a signal level of the wireless interface on network side establishing the fastest connection, switch to a wireless interface on network side having a best signal level among the one or more wireless interfaces on network side.

The present invention enables even a wireless terminal only connectable to a specific access network to select and connect to one of a plurality of access networks with different wireless interfaces through a wireless relay device. Particularly, when there is an access network having a better signal level than a signal level of one of the plurality of access networks being firstly connected, a connection can be switched to the access network. Thus, the wireless terminal can ordinarily be connected to an access network with a good signal level. In addition to the signal level, connection processing may be performed in consideration of an order of priority and service fees of a plurality of access networks. Thus, the wireless terminal can ordinarily be connected to an optimum access network.

The present invention sets or dynamically changes a channel number of a wireless LAN on local side in consideration of a wireless channel of a wireless LAN on network side, a wireless channel used by a wireless LAN neighboring to the wireless relay device, and a wireless channel for connecting to a WiMAX network. This can ensure both communication qualities of the wireless LAN on local side and the wireless LAN on network side, neighboring wireless LAN or WiMAX network therebetween.

BRIEF DESCRIPTION OF THE DRAWINGS

FIG. 4 illustrates examples of the priority levels to be given to the channel numbers of a wireless LAN on local side according to the third embodiment.

FIG. 5 illustrates examples of the priority levels to be given to the channel numbers of a wireless LAN on local side according to the fourth embodiment.

FIG. 7 illustrates examples of the priority levels to be given to the channel numbers of a wireless LAN on local side according to the fifth embodiment.

FIG. 9 illustrates examples of the priority levels to be given to the channel numbers of a wireless LAN on local side according to the sixth embodiment.

DETAILED DESCRIPTION OF THE EMBODIMENTS

First Embodiment

Figure 1:
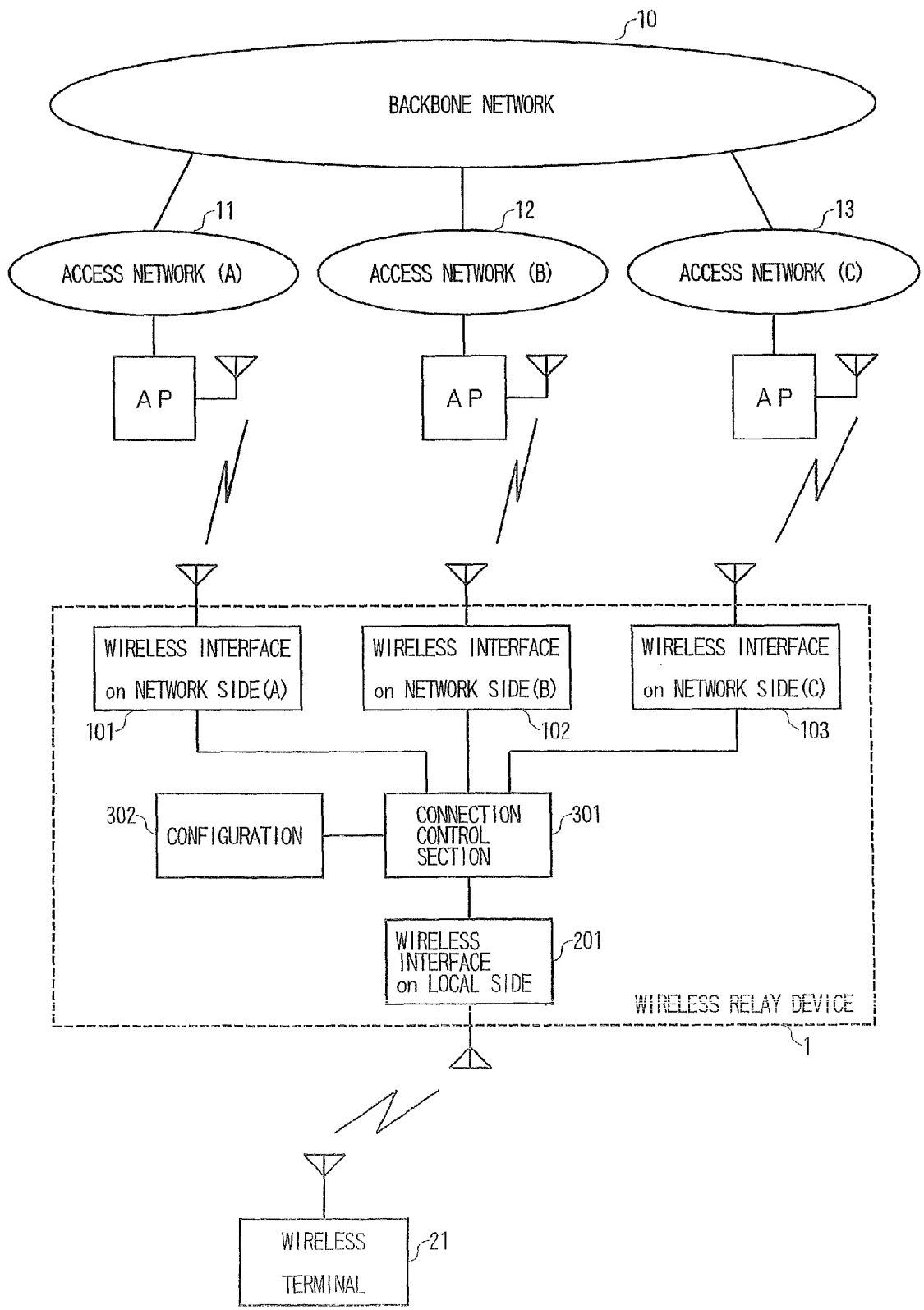
FIG. 1 illustrates the first embodiment of the present invention.

FIG. 1 illustrates the first embodiment of the present invention.

In FIG. 1, a wireless terminal 21 is connected through a wireless relay device 1 managed by a user of the wireless terminal 21 to one wireless access point (AP) of a plurality of access networks 11, 12 and 13 with different wireless interfaces and is further connected over one of the access networks 11, 12 and 13 to a backbone network 10.

The wireless relay device 1 includes wireless interfaces 101, 102 and 103 on network side connected to the access networks 11, 12 and 13, respectively, and a wireless interface 201 on local side connected to the wireless terminal 21. The wireless relay device 1 further includes a connection control section 301 which controls the connections between the wireless interfaces 101, 102 and 103 on network side and the wireless interface 201 on local side. The connection control section 301 monitors the signal levels between the access networks 11, 12 and 13 and the wireless interfaces 101, 102 and 103 on network side, selects one with a good signal level from the wireless interfaces 101, 102 and 103 on network side and connects it to the wireless interface 201 on local side. The connection control section 301 is further connected to a configuration 302 having the settings of the service-fee information and priority-level-information for each of the access networks 11, 12 and 13. With reference to the connection information, one of the wireless interfaces 101, 102 and 103 on network side to be connected is selected and is connected to the wireless interface 201 on local side.

Here, the wireless interfaces 101, 102 and 103 on network side and the wireless interface 201 on local side are only different in the wireless interfaces corresponding to the access networks and may have a common IP packets processor.

There will be described a processing routine by the wireless relay device 1, below.

1. The wireless interface 201 on local side performs processing of receiving a signal transmitted from the wireless terminal 21 and notifies it to the connection control section 301.
2. If the connection control section 301 detects the signal from the wireless terminal 21, the connection control section 301 boots the wireless interfaces 101, 102 and 103 on network side. The wireless interfaces 101, 102 and 103 on network side perform connection processing with the access networks 11, 12 and 13.
3. The connection control section 301 connects the first connected wireless interface on network side (assuming as the wireless interface 101 here) and the wireless interface 201 on local side. Here, the other wireless interfaces 102 and 103 on network side continuously perform the network access procedure.
4. The wireless terminal 21 is connected through the wireless interface 201 on local side, connection control section 301, and wireless interface 101 on network side to the access network 11 and is further connected to the backbone network 10. Thus, the wireless terminal 21 receives the supply of a requested service from the backbone network 10.
5. If the wireless connections with the access networks 12 and 13 are established, the wireless interfaces 102 and 103 on network side keep the connections. The wireless interfaces 101, 102 and 103 on network side monitor the signal levels with the access networks 11, 12 and 13 and notify the results to the connection control section 301. The signal level to be monitored may be at least one of the received signal strength indication, the throughput, the delay and the interference level. The wireless interfaces 102 and 103 on network side not connected with the wireless terminal 21 transmit and receive a predetermined dummy packet to and from the access networks 12 and 13 or receive a control signal transmitted from a wireless access point (AP) and keep monitoring the signal levels.

6. The connection control section 301 compares the signal levels with the first connected access network 11 and the other access networks 12 and 13. If one of the other access networks has a better signal level than that of the first connected access network 11, the connection control section 301 performs processing of switching the destination of the connection from the wireless interface 201 on local side to the wireless interface on network side with a higher signal level. When the received signal strength indication, throughput, delay and interference level are monitored as the signal level, the parameters may be weighted, by giving priority to the throughput, for example, and the signal level may be determined collectively. The switching processing here may use handoff processing between different access networks and may use a protocol such as mobile IP or the newly provided NETLMM (NETwork based Localized Mobility Management). The wireless terminal 21 can keep connection with the backbone network 10 without identifying the change in access network. The wireless interface on network side disconnected from the wireless interface 201 on local side does not disconnect from the access network but keeps the connection so as to address the changes in signal level. When the wireless interfaces 101, 102 and 103 on network side are disconnected from the access networks 11, 12 and 13, the wireless interfaces 101, 102 and 103 on network side perform the connection processing with the access networks again and keep connection.

7. If the connection control section 301 detects that the wireless interface 201 on local side and the wireless terminal 21 have been disconnected, the connection control section 301 performs the disconnect processing from the access networks 11, 12 and 13 on the wireless interfaces 101, 102 and 103 on network side.

Through the processing in 3. to 6, the wireless terminal 21 can first be connected quickly over one of the access networks 11, 12 and 13 to the backbone network 10. After that, through the selected one of the access networks 11, 12 and 13 with a good signal level, the wireless terminal 21 can keep connection with the backbone network 10.

The connection control section 301 may switch the connection between the wireless interface 201 on local side and the wireless interfaces 101, 102 and 103 on network side with reference to the configuration 302 and based on the service-fee information and the priority levels of the access networks. For example, one with the lowest service fee may be selected from the access networks with a certain signal level or higher. Alternatively, an access network may be selected in the order of priority defined by a user, such as an access network supporting the radio link rate specified by an application in the wireless terminal 21.

Second Embodiment

Figure 2:
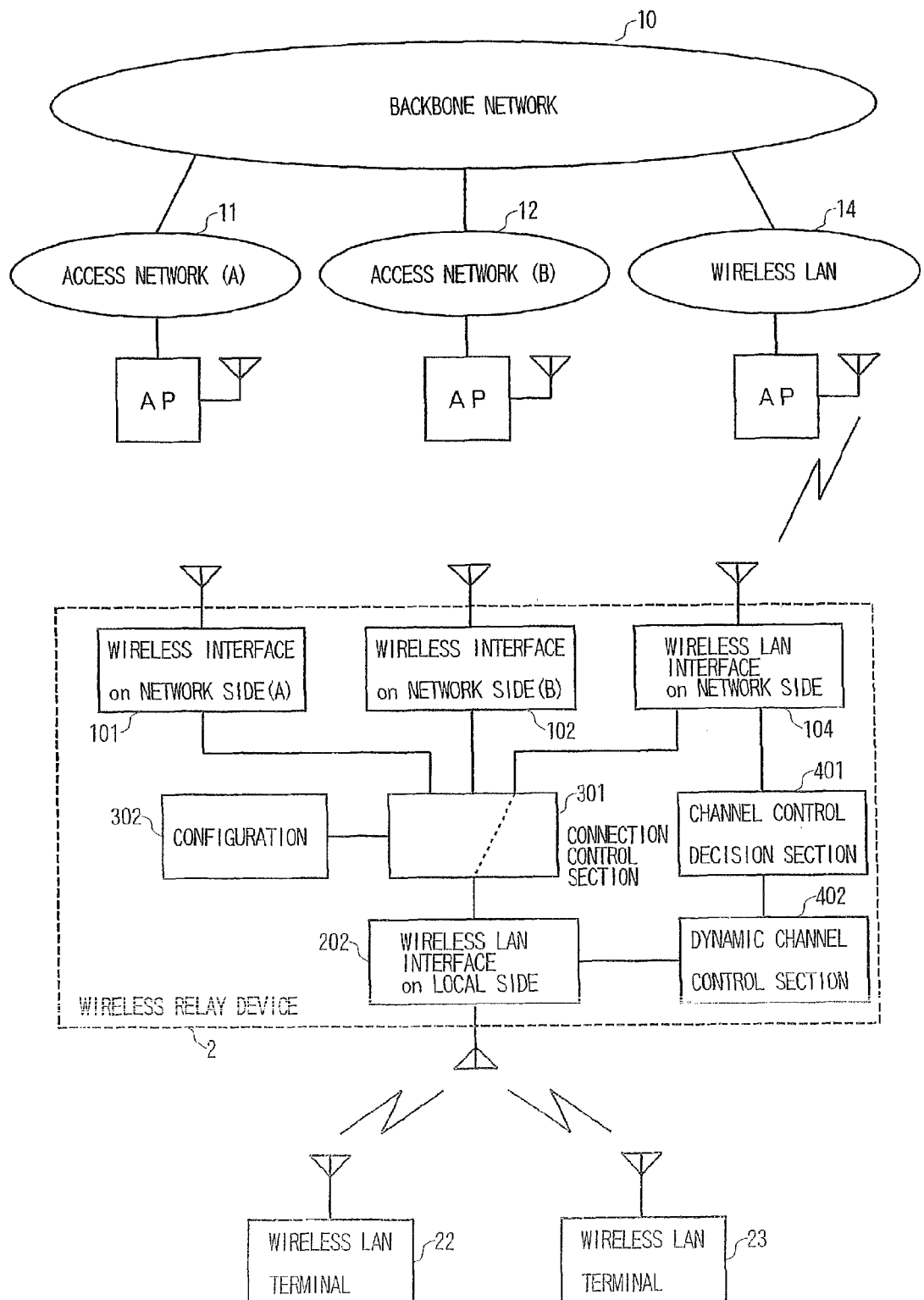
FIG. 2 illustrates the second embodiment of the present invention.

FIG. 2 illustrates the second embodiment of the present invention.

According to this embodiment, one access network 13 and the wireless interface 103 on network side and the wireless interface 201 on local side and the wireless terminal 21 according to the first embodiment illustrated in FIG. 1 are changed to support wireless LANs and are called wireless LAN 14 and wireless LAN interface 104 on network side and wireless LAN interface 202 on local side and wireless LAN terminals 22 and 23.

A wireless relay device 2 includes wireless interfaces 101 and 102 on network side separately connected to access networks 11 and 12, respectively, a wireless LAN interface 104 on network side connected to a wireless LAN 14, and wireless LAN interface 202 on local side that are simultaneously connectable to a plurality of wireless LAN terminals 22 and 23. The wireless relay device 2 further includes a connection control section 301 which performs connection control between the wireless interfaces 101 and 102 on network side and wireless LAN interface 104 on network side and the wireless LAN interface 202 on local side. The connection control section 301 monitors the signal levels between the access networks 11 and 12 and the wireless interfaces 101 and 102 on network side and between the wireless LAN 14 and the wireless LAN interface 104 on network side, selects one with a good signal level from the wireless interfaces 101 and 102 on network side and the wireless LAN interface 104 on network side and connects the selected one to the wireless interface 202 on local side.

The fundamental operations by the connection control section 301 and configuration 302 according to this embodiment are similar to those of the first embodiment. Here, through the connection control section 301, the wireless LAN interface 202 on local side and the wireless LAN interface 104 on network side are connected. In other words, the wireless LAN terminals 22 and 23 are connected through the wireless LAN interface 202 on local side, connection control section 301 and wireless LAN interface 104 on network side in the wireless relay device 2 to the wireless access point (AP) of the wireless LAN 14 and are connected through the wireless LAN 14 to a backbone network 10.

In recent years, not only PCs and PDAs but also cellular phones, portable game consoles, digital cameras and so on have had a wireless LAN. The wireless relay device 2 according to this embodiment causes the wireless LAN interface 202 on local side to function as a wireless LAN access point and thus enables those devices to connect to various access networks. Particularly, even when the wireless LAN terminals 22 and 23 are devices based on the most widely spread IEEE802.11b standard, the wireless LAN interface 104 on network side using the high-speed wireless technology (IEEE802.11a/g/n) or QoS support function (IEEE802.11e) which are the latest wireless LAN technologies, for example, allows faster and more stable wireless LAN connection.

This embodiment is characterized in that a channel control decision section 401 and a dynamic channel control section 402 are connected between the wireless LAN interface 104 on network side and the wireless LAN interface 202 on local side and the wireless channel for the wireless LAN on local side is dynamically controlled in accordance with the wireless channel used by the wireless LAN on network side.

When the connection control section 301 relays between the wireless LAN interface 104 on network side and the wireless LAN interface 202 on local side, the channel control decision section 401 acquires the channel number used for the connection with the wireless LAN 14 from the wireless LAN interface 104 on network side. If the dynamic channel control section 402 detects that the channel number on network side acquired by the channel control decision section 401 and the wireless LAN channel number on local side used by the wireless LAN interface 202 on local side are same or near, the dynamic channel control section 402 instructs the wireless LAN interface 202 on local side to change the wireless LAN channel number on local side to a different channel number that is not same as and near the channel number on network side. The wireless LAN interface 202 on local side has a function of switching the wireless channel to and from the wireless LAN terminals 22 and 23 to the changed channel number when the wireless LAN interface 202 on local side is instructed to change the channel number to use by the dynamic channel control section 402.

It is generally known that a wireless LAN system (IEEE802.11b and g) using the 2.4 GHz band causes interference near the used channel number. Accordingly, the channel control decision section 401 and dynamic channel control section 402 control the wireless LAN interface 202 on local side so as not to use the channel number that is same as or near the channel number used by the wireless LAN interface 104 on network side. Thus, the interference can be avoided between the wireless LAN on network side and the wireless LAN on local side, and good communication quality can be provided at both of them.

Third Embodiment

The wireless LAN interface 202 on local side of the second embodiment is controlled by the channel control decision section 401 and dynamic channel control section 402 so as not to use the channel number that is same as or near the channel number used by the wireless LAN interface 104 on network side. According to the third embodiment of the present invention, priority levels are set to the channel numbers to be used by the wireless LAN interface 202 on local side based on the interference condition between the wireless channels used by the wireless LAN interface 104 on network side and the wireless LAN interface 202 on local side. In accordance with the priority levels, the channel number to be used by the wireless LAN interface 202 on local side is selected.

Figure 3:
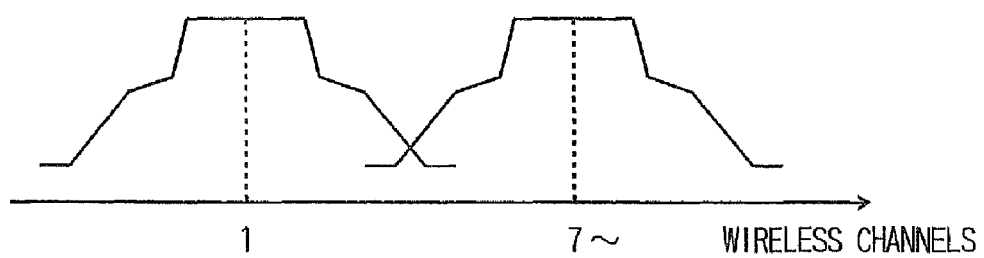
FIG. 3 illustrates examples of the interference condition between wireless channels.
Figure 3:
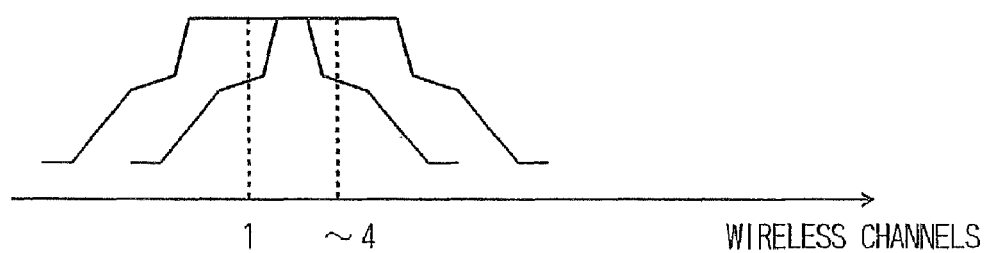
Figure 3:
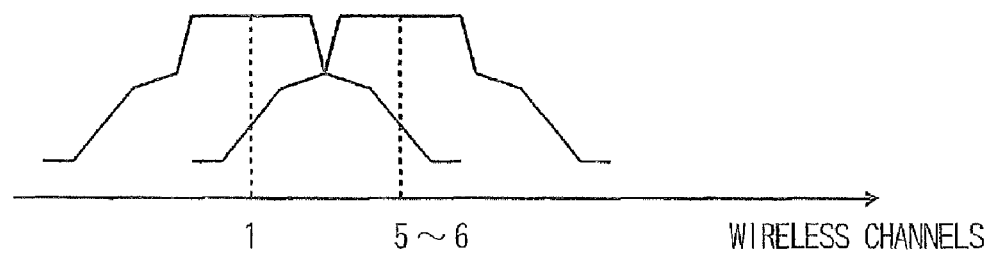

FIG. 3 illustrates examples of the interference condition between wireless channels.

The interference condition in (1) in FIG. 3 exhibits a spectrum mask when two wireless channels are six or more channels away from each other. In this case, no mutual interference is occurring between the two wireless channels, and each of the wireless channels independently has good communication.

The interference condition in (2) in FIG. 3 exhibits a spectrum mask when the two wireless channels are close to each other within three channels. In this case, the two wireless channels have strong interference. However, an access procedure based on the carrier sense in CSMA/CA (Carrier Sense Multiple Access with Collision Avoidance) can detect a period without interference on the channels because one of them is not used, for example, and can transmit a signal therefor. Thus, both of them can have good communication though the throughput slightly decreases. In other words, when two wireless channels are near each other as much as that the carrier sense in CSMA/CA can function validly, the two wireless channels can be used.

The interference condition in (3) in FIG. 3 exhibits a spectrum mask when two wireless channels are four to five channels away from each other. In this case, weak interference is occurring between the two wireless channels. Thus, the carrier sense in CSMA/CA does not validly function, and a signal may be transmitted even though mutual interference is occurring therebetween. As a result, transmission failures are repeated, and the throughput decreases significantly. In other words, when two wireless channels have a relationship between those in (1) and (2) in FIG. 3, the two wireless channels are not to be used.

Accordingly, in the order (1), (2) and (3) in FIG. 3, priority levels A, B and D may be set to the channel numbers to be used by the wireless LAN interface 202 on local side. FIG. 4 illustrates the priority levels A, B and D to be given to the channel numbers of a wireless LAN on local side against the channel numbers of a wireless LAN on network side.

In FIG. 4, when the wireless LAN interface 104 on network side is using Channel Number 5, for example, Channel Numbers 2 to 8 near Channel Number 5 within three channels in Channel Numbers 1 to 13 to be used by the wireless LAN interface 202 on local side have a priority level B, Channel Numbers 1, 9 and 10 which are four to five channels away from Channel Number 5 have a priority level D, and Channel Numbers 11 to 13 which are six or more channels away from Channel Number 5 have a priority level A. In this case, the channel control decision section 401 and dynamic channel control section 402 exclude Channel Numbers 1, 9 and 10 with the priority level D from the channel numbers to be used by the wireless LAN interface 202 on local side and control so as to first select one of Channel Numbers 11 to 13 with the priority level A and then select one of Channel Numbers 2 to 8 with the priority level B.

According to the second embodiment, the interference between two wireless channels is simply associated with the difference in channel number. In other words, it is simply controlled so as not to use the channel numbers with the priority levels B and D in FIG. 4. According to this embodiment, in consideration of the interference condition based on the spectrum masks of two wireless channels, the priority levels A, B and D are set to the channel numbers to be used by the wireless LAN interface 202 on local side. Thus, the channel numbers with the priority level D are not used, but the channel numbers with the priority level A or priority level B are made available. This can increase the range of available channels.

Having described that, according to this embodiment, the method that presumes the interference condition based on spectrum masks, other methods may be used to presume the interference condition. For example, when the real pattern of leakage power is available from actual measurement thereof, for example, it may be used to set the priority levels. This further can increase the range of available channels.

Fourth Embodiment

According to the second embodiment, the wireless LAN interface 202 on local side is configured so as not to use the same channel number to the channel number used by the wireless LAN interface 104 on network side. According to the fourth embodiment of the present invention, the same channel number is actively used in addition to the method of the third embodiment.

In the interference condition in (2) in FIG. 3, when one uses Wireless Channel 1, the other more preferably uses Wireless Channel 1 rather than the use of Wireless Channel 2, 3 or 4. The reason is as follows. In CSMA/CA in a wireless LAN, in addition to physical carrier sense which determines the presence of a signal transmitted to a wireless channel based on the real signal received power, virtual carrier sense is used which determines the presence of a future signal based on the reserved time for the wireless channel acquired by decoding the received signal. Thus, the use of the same wireless channel as the wireless channel used by another wireless LAN causing interference waves allows detection of the interference by both of the physical carrier sense and the virtual carrier sense. On the other hand, when a different wireless channel is used, the physical carrier sense is only used to avoid the interference. Thus, the precision of the interference avoidance decreases, and the communication is more susceptible to the interference. Therefore, when wireless channels that are same as or near that of another wireless LAN are only available, the active use of the same wireless channel as the wireless channel used by the other wireless LAN is preferable.

According to this embodiment, the interference condition in (2) in FIG. 3 is divided into a same wireless channel in (2)-1 and a near wireless channel in (2)-2, and, in order of those in (1), (2)-1, (2)-2 and (3) in FIG. 3, priority levels A, B, C and D are set to channel numbers to be used by the wireless LAN interface 202 on local side. FIG. 5 illustrates the priority levels A, B, C and D to be given to the channel numbers for the wireless LAN interface 202 on local side against the channel numbers for the wireless LAN interface 104 on network side.

In FIG. 5, when the wireless LAN interface 104 on network side uses Channel Number 5, for example, same Channel Number 5 has the priority level B, Channel Numbers 2 to 4 and 6 to 8 near Channel Number 5 within one to three channels have the priority level C, Channel Numbers 1, 9 and 10 four to five channels away from Channel Number 5 have the priority level D, and Channel Numbers 11 to 13 six or more channels away from Channel Number 5 have the priority level A, in Channel Numbers 1 to 13 available to the wireless LAN interface 202 on local side. In this case, the channel control decision section 401 and dynamic channel control section 402 are controlled so as to exclude Channel Numbers 1, 9 and 10 with the priority level D from the channel numbers to be used by the wireless LAN interface 202 on local side, first select one of Channel Numbers 11 to 13 with the priority level A, next select Channel Number 5 with the priority level B, and next select one of Channel Numbers 2 to 4 and 6 to 8 with the priority level C.

According to the second embodiment, as a result, it is controlled such that the channel number with the priority level A in FIG. 5 is to be used and the channel numbers with the priority levels B to D are not to be used. According to this embodiment, the use of the channel numbers with the priority levels A, B and C in accordance with the priority levels can increase the range of the available channels. This embodiment is particularly different from the third embodiment in that a higher priority level is set to the same channel number as the channel number used by the wireless LAN interface 104 on network side.

Fifth Embodiment

Figure 6:
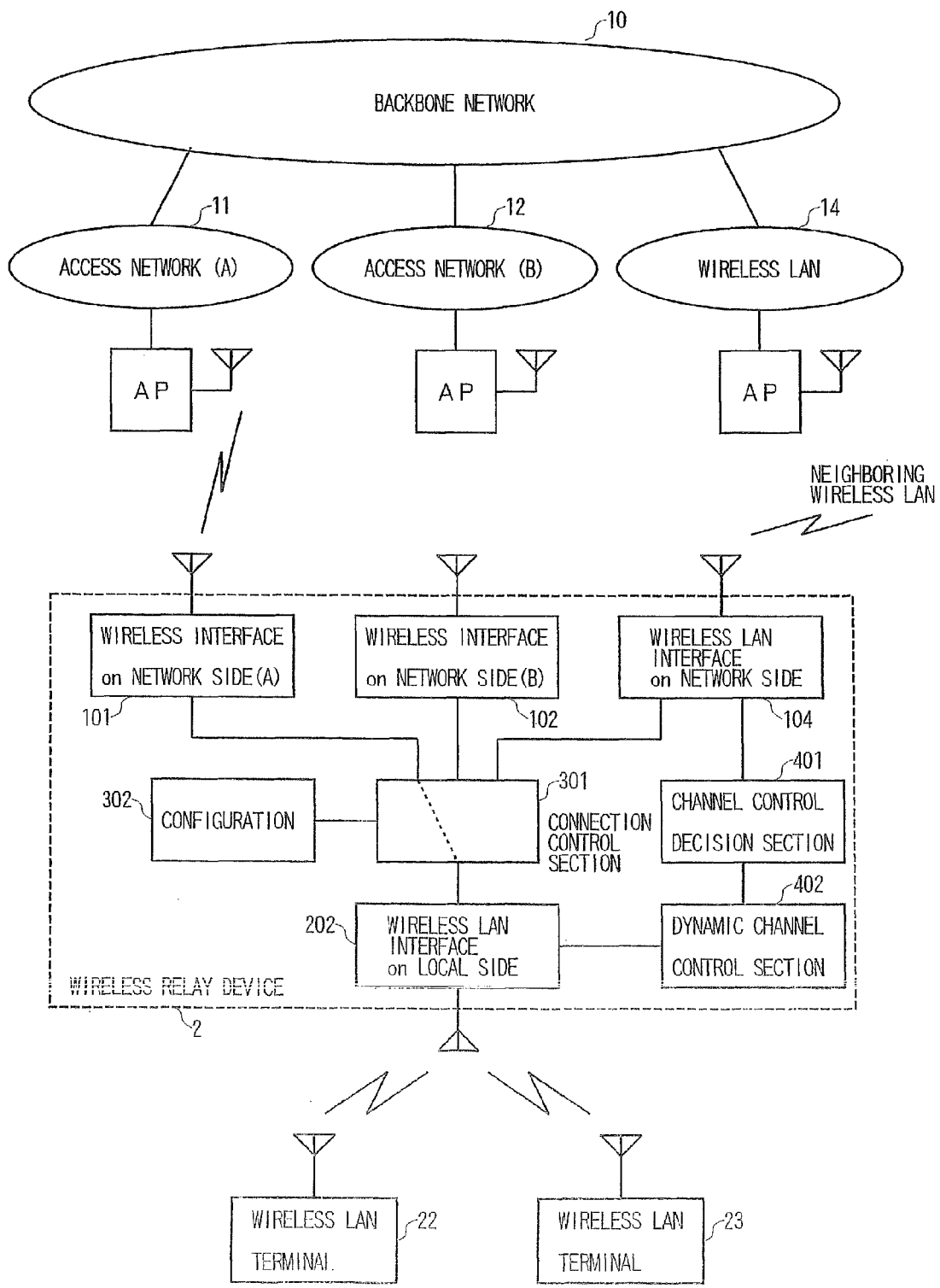
FIG. 6 illustrates the fifth embodiment of the present invention.

FIG. 6 illustrates the fifth embodiment of the present invention.

According to the fifth embodiment, the destination of the connection on network side from the wireless relay device 2 of the second embodiment illustrated in FIG. 2 is the access network 11. In other words, the wireless LAN terminals 22 and 23 are connected through the wireless LAN interface 202 on local side, connection control section 301 and wireless interface 101 on network side in the wireless relay device 2 to a wireless access point (AP) in the access network 11 and are connected over the access network 11 to the backbone network 10.

According to this embodiment, a channel control decision section 401 uses a wireless LAN interface 104 on network side to acquire the channel number used by a neighboring wireless LAN. If a dynamic channel control section 402 detects that the channel number used by the neighboring wireless LAN acquired by the channel control decision section 401 is same as or near the wireless LAN channel number on local side used by the wireless LAN interface 202 on local side, the dynamic channel control section 402 instructs the wireless LAN interface 202 on local side to change the wireless LAN channel number on local side to another channel number that is not same as and near the channel number on network side. The wireless LAN interface 202 on local side has a function of switching the wireless channels used between the wireless LAN interface 202 on local side and the wireless LAN terminals 22 and 23 to the changed channel numbers if instructed by the dynamic channel control section 402 to change the channel number to use.

With the recent wide spread of wireless LANs, a significantly large number of wireless LAN access points are provided. Thus, fewer channels may be available, or the channel utilization of a wireless LAN may frequently change with the movements of users or the like. For that, while the wireless LAN interface 104 on network side is not running, the channel utilization of neighboring wireless LANs may be searched, and the result may be reflected to the selection of the channel number to be used by the wireless LAN interface 202 on local side. This can ensure the communication quality of the wireless LAN on local side.

The wireless LAN interface 104 on network side and wireless LAN interface 202 on local side accommodated in the wireless relay device 2 are adjacent to each other, and the interference level between them is high. According to the second embodiment, the channel to be used by the wireless LAN interface 202 on local side is controlled such that the channel numbers to be used by them may not be same or near each other. On the other hand, according to the fifth embodiment, the wireless LAN interface 104 on network side in the wireless relay device 2 does not transmit signals but only monitors neighboring wireless LANs. Thus, the wireless LAN interface 104 on network side does not have mutual interference with the wireless LAN interface 202 on local side. The interference source to the wireless LAN on local side is a neighboring wireless LAN only and a wireless channel that is very near the wireless channel used by the wireless LAN on local side. Thus, the wireless LAN interface 202 on local side may avoid the channel number that is very near the channel number used by a neighboring wireless LAN.

Like the third embodiment, based on the interference condition between the wireless channels used by the neighboring wireless LAN and wireless LAN interface 202 on local side, priority levels may be set to the channel number to be used by the wireless LAN interface 202 on local side. In accordance with the priority levels, the channel number to be used by the wireless LAN interface 202 on local side may be selected.

Like the fourth embodiment, the wireless LAN interface 202 on local side may actively use the same channel number as the channel number used by a neighboring wireless LAN. FIG. 7 illustrates priority levels A, B and C given to the channel numbers to be used by the wireless LAN interface 202 on local side against the channel numbers used by neighboring wireless LANs.

In FIG. 7, when a neighboring wireless LAN uses Channel Number 5, for example, same Channel Number 5 has a priority level B, Channel Numbers 3 and 4 and 6 and 7 which are near Channel Number 5 within one or two channels have a priority level C, Channel Numbers 1 and 2 and 8 to 13 three channels away from Channel Number 5 have a priority level A, in Channel Numbers 1 to 13 available to the wireless LAN interface 202 on local side. In this case, the channel control decision section 401 and dynamic channel control section 402 control so as to first select one of Channel Numbers 1 and 2 and 8 to 13 with the priority level A as the channel number to be used by the wireless LAN interface 202 on local side, next select Channel Number 5 with priority level B and select one of Channel Numbers 3 and 4 and 6 and 7 with the priority level C.

Sixth Embodiment

Figure 8:
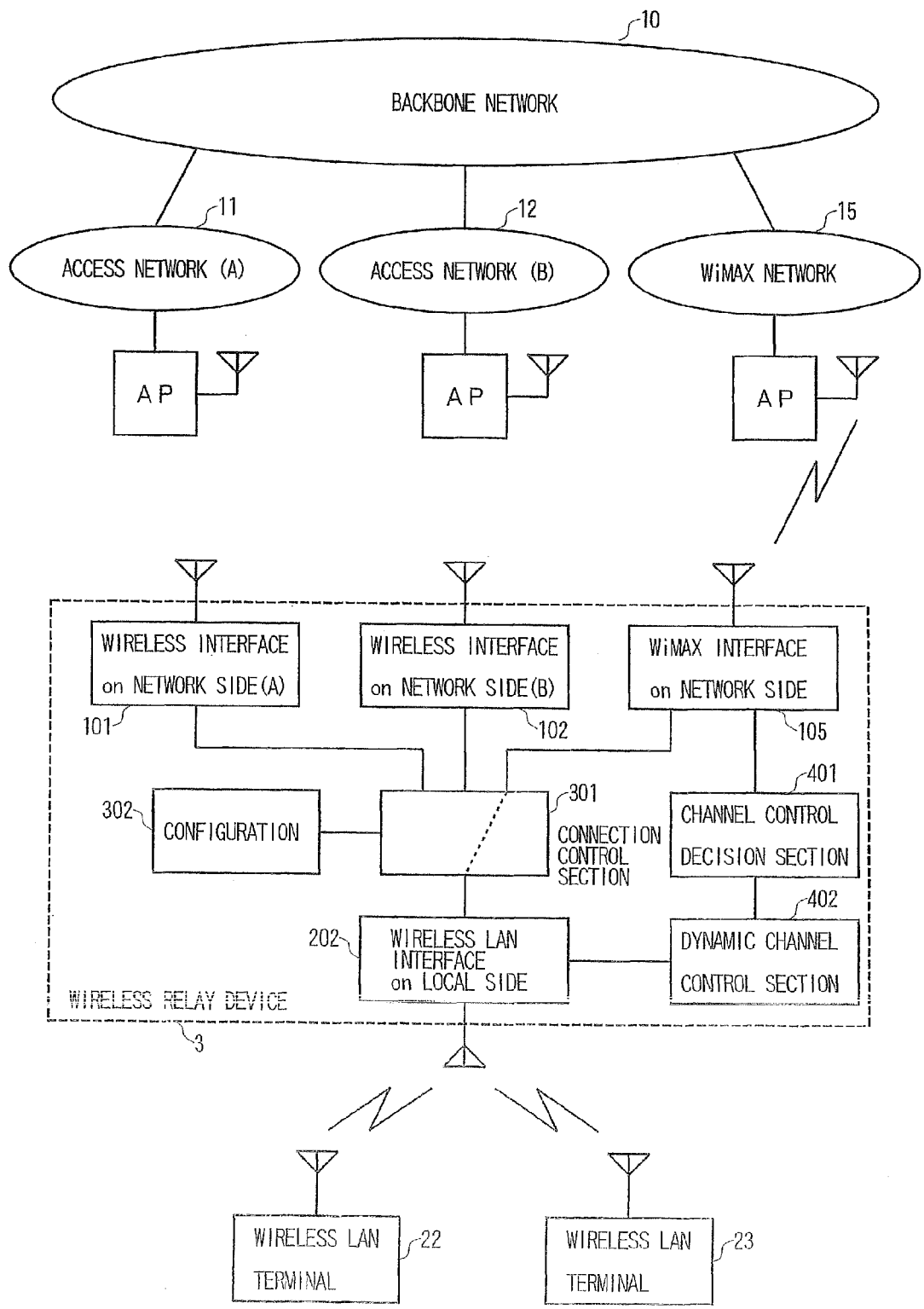
FIG. 8 illustrates the sixth embodiment of the present invention.

FIG. 8 illustrates the sixth embodiment of the present invention.

According to this embodiment, the wireless LAN 14 and wireless LAN interface 104 on network side of the second embodiment illustrated in FIG. 2 are changed to a WiMAX network 15 and WiMAX interface 105 on network side supporting WiMAX. The fundamental operations by the connection control section 301 and configuration 302 according to this embodiment are similar to those of the second embodiment.

A wireless relay device 3 includes wireless interfaces 101 and 102 on network side separately connected to access networks 11 and 12, respectively, a WiMAX interface 105 on network side connected to the WiMAX network 15, and a wireless LAN interface 202 on local side which are simultaneously connectable to a plurality of wireless LAN terminals 22 and 23. The wireless relay device 3 further includes a connection control section 301 which performs connection control between the wireless interfaces 101 and 102 on network side and WiMAX interface 105 on network side and the wireless LAN interface 202 on local side. The connection control section 301 monitors the signal levels between the access networks 11 and 12 and the wireless interfaces 101 and 102 on network side and between the WiMAX network 15 and the WiMAX interface 105 on network side, selects one with a good signal level of the wireless interfaces 101 and 102 on network side and WiMAX interface 105 on network side and connects the selected one to the wireless interface 202 on local side. The connection control section 301 is further connected to a configuration 302 having the settings of the service-fee information and the priority-level-information for each of the access networks 11 and 12 and WiMAX network 15. With reference to the connection information, one of the wireless interfaces 101 and 102 on network side and WiMAX interface 105 on network side is selected and is connected to the wireless interface 203 on local side.

Here, the wireless LAN terminals 22 and 23 are connected through the wireless LAN interface 202 on local side, connection control section 301 and WiMAX interface 105 on network side in the wireless relay device 3 to a wireless access point (AP) in the WiMAX network 15 and are connected over the WiMAX network 15 to a backbone network 10. According to this embodiment, a channel control decision section 401 and a dynamic channel control section 402 are connected between the WiMAX interface 105 on network side and the wireless LAN interface 202 on local side and dynamically control wireless channels of a wireless LAN on local side while the WiMAX interface 105 on network side is running.

In other words, when the connection control section 301 relays between the WiMAX interface 105 on network side and the wireless LAN interface 202 on local side, the channel control decision section 401 acquires WiMAX connection information from the WiMAX interface 105 on network side. If the dynamic channel control section 402 detects from the channel control decision section 401 that the WiMAX interface 105 on network side is running, the dynamic channel control section 402 instructs the wireless LAN interface 202 on local side to change the wireless LAN channel number on local side to the channel number sufficiently away from the channel number used by WiMAX. The wireless LAN interface 202 on local side has a function of switching the wireless channels used between the wireless LAN interface 202 and the wireless LAN terminals 22 and 23 to the changed channel numbers if instructed by the dynamic channel control section 402 to change the channel numbers to use.

In WiMAX using the 2.5 GHz band, channel numbers at high frequencies in Channel Numbers 1 to 13 used by wireless LANs, such as Channel Numbers 7 to 13, have mutual interference. Accordingly, the channel control decision section 401 and dynamic channel control section 402 control so as to set the priority level A to Channel Numbers 1 to 6 and the priority level D to Channel Numbers 7 to 13, as illustrated in FIG. 9 and avoid the use of the channel numbers with the priority level D by the wireless LAN interface 202 on local side while the WiMAX interface 105 on network side is running. This allows avoidance of the interference between the WiMAX network and the wireless LAN on local side and can provide both of them with good communication quality.

Seventh Embodiment

Figure 10:
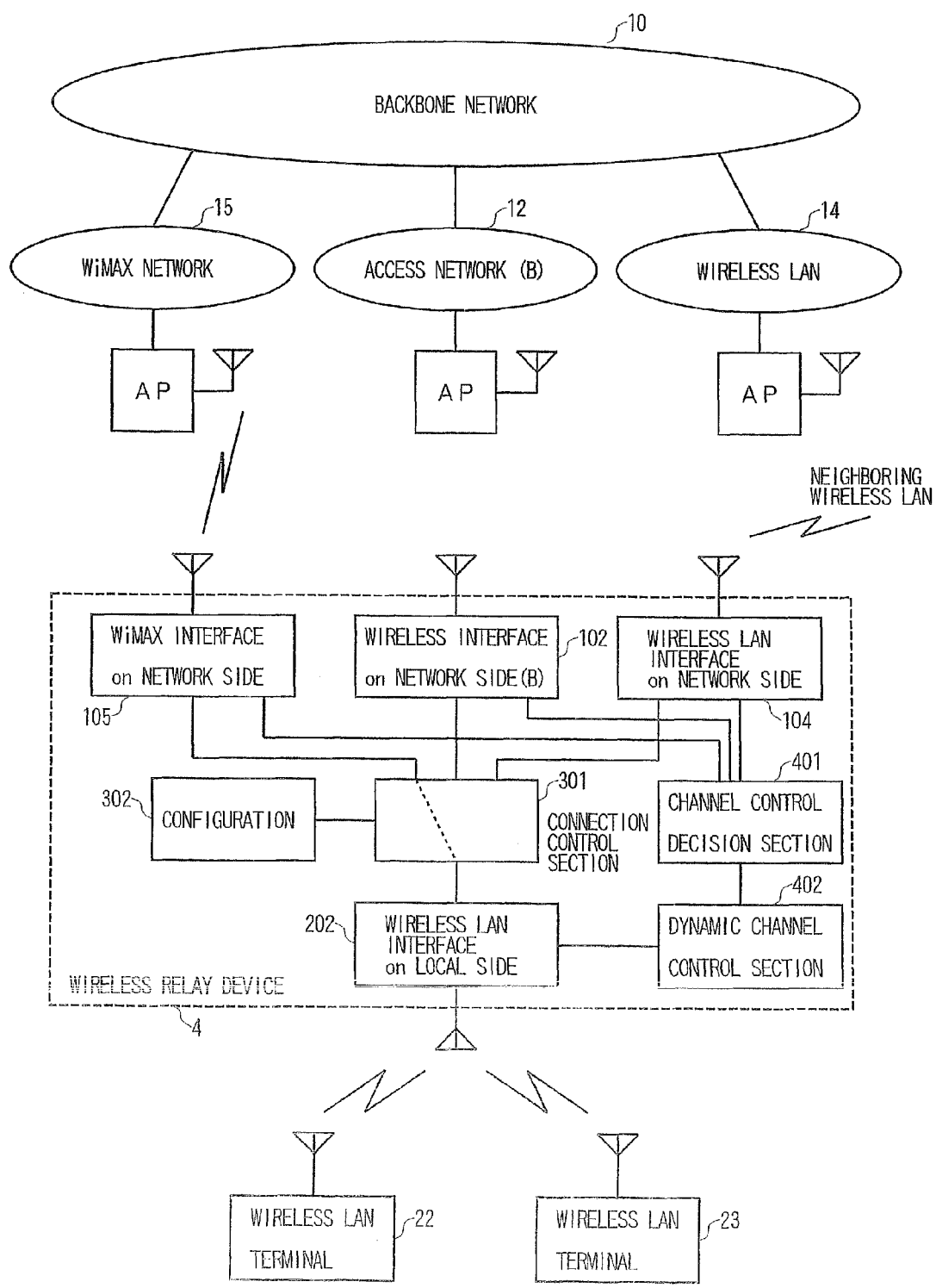
FIG. 10 illustrates the seventh embodiment of the present invention.

FIG. 10 illustrates the seventh embodiment of the present invention.

According to the seventh embodiment, the connected access network 11 and wireless interface 101 on network side according to the fifth embodiment illustrated in FIG. 6 are changed to a WiMAX network 15 and WiMAX interface 105 on network side supporting WiMAX. In other words, the wireless LAN terminals 22 and 23 are connected through the wireless LAN interface 202 on local side, connection control section 301 and WiMAX interface 105 on network side in the wireless relay device 2 to a wireless access point (AP) of the WiMAX network 15 and are connected over the WiMAX network 15 to the backbone network 10.

The channel control decision section 401 according to this embodiment receives the input of the channel number used by a neighboring wireless LAN from the wireless LAN interface 104 on network side and input of running information from the WiMAX interface 105 on network side. In consideration of the channel number used by a neighboring wireless LAN acquired by the channel control decision section 401, the dynamic channel control section 402 sets the channel number to be used by the wireless LAN interface 202 on local side. Furthermore, in accordance with the running information on the WiMAX interface 105 on network side, the dynamic channel control section 402 sets the channel number that is not near that of the wireless channel used by WiMAX to the wireless LAN interface 202 on local side. For example, the synthesis result of the priority levels of the channel numbers for the wireless LAN on local side illustrated in FIG. 7 and FIG. 9 may be used. In other words, in FIG. 7, while WiMAX is running, the priority level D may be set to Channel Numbers 7 to 13 for the wireless LAN on local side, and the channel number according to the priority levels A to C given to Channel Numbers 1 to 6 may be selected.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modification and equivalents may be resorted to, falling within the scope thereof.

The invention claimed is:

1. A wireless relay device connecting a wireless terminal to one of a plurality of access networks with different wireless interfaces and performing relay processing between the wireless terminal and one of the plurality of access networks being connected, the wireless relay device, comprising:
   a wireless interface on local side which has a wireless interface to be connected to the wireless terminal;
   a plurality of wireless interfaces on network side which have wireless interfaces to be connected to the plurality of respective access networks; and
   a connection control section which boots the plurality of wireless interfaces on network side when the wireless interface on local side receives a signal from the wireless terminal, connects a wireless interface on network side establishing a fastest connection and the wireless interface on local side, and connects the wireless terminal to an access network corresponding to the wireless interface on network side establishing the fastest connection, wherein:
   one of the plurality of access networks and one of the plurality of wireless interfaces on network side support a wireless LAN, and the wireless interface on local side and the wireless terminal support another wireless LAN;
   the wireless relay device further comprises a channel control section which controls so as to, when one of the plurality of wireless interfaces on network side and the wireless interface on local side supporting the wireless LAN are relayed via the connection control section, acquire a wireless LAN channel number on network side used by one of the plurality of wireless interfaces on network side, and when the wireless LAN channel number on network side and a wireless LAN channel number on local side used by the wireless interface on local side are detected as being same or near each other, change the wireless LAN channel number on local side to another channel number which is not same as and near the wireless LAN channel number on network side; and
   the wireless interface on local side has a function to, when a channel number is instructed from the channel control section, switch a wireless channel between the wireless terminal and the wireless interface on local side to the channel number being instructed.

2. A wireless relay device connecting a wireless terminal to one of a plurality of access networks with different wireless interfaces and performing relay processing between the wireless terminal and one of the plurality of access networks being connected, the wireless relay device, comprising:
   a wireless interface on local side which has a wireless interface to be connected to the wireless terminal;
   a plurality of wireless interfaces on network side which have wireless interfaces to be connected to the plurality of respective access networks; and
   a connection control section which boots the plurality of wireless interfaces on network side when the wireless interface on local side receives a signal from the wireless terminal, connects a wireless interface on network side establishing a fastest connection and the wireless interface on local side, and connects the wireless terminal to an access network corresponding to the wireless interface on network side establishing the fastest connection, wherein:
   one of the plurality of access networks and one of the plurality of wireless interfaces on network side support a wireless LAN, and the wireless interface on local side and the wireless terminal support another wireless LAN;
   the wireless relay device further comprises a channel control section which controls so as to, when one of the plurality of wireless interfaces on network side and the wireless interface on local side supporting the wireless LAN are relayed via the connection control section, acquire a wireless LAN channel number on network side used by one of the plurality of wireless interfaces on network side, and when the wireless LAN channel number on network side and a wireless LAN channel number on local side used by the wireless interface on local side are detected as channel numbers having mutual interference, change the wireless LAN channel number on local side to another channel number with lower quality degradation due to an interference with the wireless LAN channel number on network side; and
   the wireless interface on local side has a function to, when a channel number is instructed from the channel control section, switch a wireless channel between the wireless terminal and the wireless interface on local side to the channel number being instructed.

3. A wireless relay device connecting a wireless terminal to one of a plurality of access networks with different wireless interfaces and performing relay processing between the wireless terminal and one of the plurality of access networks being connected, the wireless relay device, comprising:
   a wireless interface on local side which has a wireless interface to be connected to the wireless terminal;
   a plurality of wireless interfaces on network side which have wireless interfaces to be connected to the plurality of respective access networks; and
   a connection control section which boots the plurality of wireless interfaces on network side when the wireless interface on local side receives a signal from the wireless terminal, connects a wireless interface on network side establishing a fastest connection and the wireless interface on local side, and connects the wireless terminal to an access network corresponding to the wireless interface on network side establishing the fastest connection, wherein:
   one of the plurality of access networks and one of the plurality of wireless interfaces on network side support a wireless LAN, and the wireless interface on local side and the wireless terminal support another wireless LAN;
   the wireless relay device further comprises a channel control section which controls so as to, when one of the plurality of wireless interfaces on network side not supporting the wireless LAN and the wireless interface on local side supporting the wireless LAN are relayed via the connection control section, acquire a channel number used by a neighboring wireless LAN from one of the plurality of wireless interfaces on network side supporting the wireless LAN, and when the channel number used by the neighboring wireless LAN and a wireless LAN channel number on local side used by the wireless interface on local side are detected as being same or near each other, change the wireless LAN channel number on local side to another channel number which is not near the channel number used by the neighboring wireless LAN; and
   the wireless interface on local side has a function to, when a channel number is instructed from the channel control section, switch a wireless channel between the wireless terminal and the wireless interface on local side to the channel number being instructed.

4. A wireless relay device connecting a wireless terminal to one of a plurality of access networks with different wireless interfaces and performing relay processing between the wireless terminal and one of the plurality of access networks being connected, the wireless relay device, comprising:
- a wireless interface on local side which has a wireless interface to be connected to the wireless terminal;
- a plurality of wireless interfaces on network side which have wireless interfaces to be connected to the plurality of respective access networks; and
- a connection control section which boots the plurality of wireless interfaces on network side when the wireless interface on local side receives a signal from the wireless terminal, connects a wireless interface on network side establishing a fastest connection and the wireless interface on local side, and connects the wireless terminal to an access network corresponding to the wireless interface on network side establishing the fastest connection, wherein:
- one of the plurality of access networks and one of the plurality of wireless interfaces on network side support a wireless LAN, and the wireless interface on local side and the wireless terminal support another wireless LAN;
- the wireless relay device further comprises a channel control section which controls so as to, when one of the plurality of wireless interfaces on network side not supporting the wireless LAN and the wireless interface on local side supporting the wireless LAN are relayed via the connection control section, acquire a channel number used by a neighboring wireless LAN from one of the plurality of wireless interfaces on network side supporting the wireless LAN, and when the channel number used by the neighboring wireless LAN and a wireless LAN channel number on local side used by the wireless interface on local side are detected as channel numbers with mutual interference, change the wireless LAN channel number on local side to another channel number with low quality degradation due to an interference with the wireless channel used by the neighboring wireless LAN; and
- the wireless interface on local side has a function to, when a channel number is instructed from the channel control section, switch a wireless channel between the wireless terminal and the wireless interface on local side to the channel number being instructed.

5. A wireless relay device connecting a wireless terminal to one of a plurality of access networks with different wireless interfaces and performing relay processing between the wireless terminal and one of the plurality of access networks being connected, the wireless relay device, comprising:
- a wireless interface on local side which has a wireless interface to be connected to the wireless terminal;
- a plurality of wireless interfaces on network side which have wireless interfaces to be connected to the plurality of respective access networks; and
- a connection control section which boots the plurality of wireless interfaces on network side when the wireless interface on local side receives a signal from the wireless terminal, connects a wireless interface on network side establishing a fastest connection and the wireless interface on local side, and connects the wireless terminal to an access network corresponding to the wireless interface on network side establishing the fastest connection, wherein:
- one of the plurality of access networks and one of the plurality of wireless interfaces on network side support WiMAX and the wireless interface on local side and the wireless terminal support a wireless LAN;
- the wireless relay device further comprises a channel control section which controls so as to, when the wireless interface on network side supporting the WiMAX and the wireless interface on local side supporting the wireless LAN are relayed via the connection control section and when a channel number used by the WiMAX and a wireless LAN channel number on local side used by the wireless interface on local side are detected as channel numbers with mutual interference, change the wireless LAN channel number on local side to another channel number with low quality degradation due to an interference with the wireless channel used by the WiMAX; and
- the wireless interface on local side has a function to, when a channel number is instructed from the channel control section, switch a wireless channel between the wireless terminal and the wireless interface on local side to the channel number being instructed.

6. The wireless relay device according to claims 1, 2, 3, 4, or 5, wherein:
- the plurality of wireless interfaces on network side monitor signal levels between the plurality of wireless interfaces on network side and the respective access networks being connected, and notify results to the connection control section; and
- the connection control section compares the signal levels between the plurality of wireless interfaces on network side and the access networks notified from the plurality of wireless interfaces on network side and, when there is one or more wireless interfaces on network side having a better signal level than a signal level of the wireless interface on network side establishing the fastest connection, switches to a wireless interface on network side having a best signal level among the one or more wireless interfaces on network side.

7. The wireless relay device according to claim 6, wherein the wireless interfaces on network side monitor at least one of a received signal strength indication, a throughput, a delay and an interference level as the signal levels.

8. The wireless relay device according to claim 6, wherein the connection control section includes information on priority levels and service fees of the plurality of access networks, and compares and determines parameters of the priority levels and service fees in addition to the signal levels, selects one wireless interface on network side and connects one wireless interface on network side being selected to the wireless interface on local side.

9. The wireless relay device according to claim 2, wherein the channel control section gives priority levels to channel numbers in ascending order of the quality degradation due to the interference, and the wireless LAN channel number on local side is selected in accordance with priority levels from channel numbers excluding channel numbers with low priority levels.

10. A wireless communication system, comprising a wireless relay device according to claims 1, 2, 3, 4, or 5, the wireless relay device connecting a wireless terminal to one of a plurality of access networks with different wireless interfaces and performing relay processing between the wireless terminal and one of the plurality of access networks being connected.

11. The wireless communication system according to claim 10, wherein:
- the plurality of wireless interfaces on network side monitor signal levels between the plurality of wireless interfaces on network side and the respective access networks, and notify results to the connection control section; and
- the connection control section compares the signal levels between the plurality of wireless interfaces on network side and the access networks notified from the plurality of wireless interfaces on network side and, when there is one or more wireless interfaces on network side having a better signal level than a signal level of the wireless interface on network side establishing the fastest connection, switches to a wireless interface on network side having a best signal level among the one or more wireless interfaces on network side.

12. The wireless relay device according to claim 4, wherein the channel control section gives priority levels to channel numbers in ascending order of the quality degradation due to the interference, and the wireless LAN channel number on local side is selected in accordance with priority levels from channel numbers excluding channel numbers with low priority levels.

13. The wireless relay device according to claim 5, wherein the channel control section gives priority levels to channel numbers in ascending order of the quality degradation due to the interference, and the wireless LAN channel number on local side is selected in accordance with priority levels from channel numbers excluding channel numbers with low priority levels.

* * * * *